US007605953B2

(12) United States Patent
Crooker et al.

(10) Patent No.: US 7,605,953 B2
(45) Date of Patent: Oct. 20, 2009

(54) METHOD AND APPARATUS TO COMPENSATE FOR IMPERFECT SCANNER MOTION

(75) Inventors: Aaron Ray Crooker, Lexington, KY (US); Noah Jonathon Gawlik, Lexington, KY (US); Marc Alan Herwald, Lexington, KY (US); Michael Anthony Marra, III, Lexington, KY (US); Donald Norman Spitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 984 days.

(21) Appl. No.: 10/863,909

(22) Filed: Jun. 9, 2004

(65) Prior Publication Data

US 2005/0275907 A1   Dec. 15, 2005

(51) Int. Cl.
*H04N 1/04* (2006.01)
*H04N 1/36* (2006.01)

(52) U.S. Cl. .................. 358/474; 358/496; 358/497; 358/412

(58) Field of Classification Search ............. 358/474, 358/496, 497, 498, 412, 413
See application file for complete search history.

(56) References Cited

U.S. PATENT DOCUMENTS

| 6,016,207 | A | 1/2000 | Wield |
| 6,069,464 | A * | 5/2000 | Wu .............................. 318/610 |
| 6,178,015 | B1 | 1/2001 | Lee et al. |
| 6,518,587 | B2 | 2/2003 | Rombola |
| 6,525,845 | B1 | 2/2003 | Sharma et al. |
| 6,571,189 | B2 | 5/2003 | Jensen et al. |
| 6,580,528 | B1 | 6/2003 | Imoto et al. |
| 6,603,514 | B1 | 8/2003 | Tsai et al. |
| 6,643,035 | B1 | 11/2003 | Salgado |
| 6,650,441 | B1 | 11/2003 | Horigome et al. |
| 6,707,582 | B2 * | 3/2004 | Chen .......................... 358/474 |
| 2002/0080427 | A1 | 6/2002 | Clifton |
| 2002/0159100 | A1 | 10/2002 | Okutomi et al. |
| 2002/0186425 | A1 | 12/2002 | Dufaux et al. |
| 2003/0007197 | A1 | 1/2003 | Kim |
| 2003/0011828 | A1 | 1/2003 | Chiu |
| 2003/0095294 | A1 | 5/2003 | Shih et al. |
| 2004/0047004 | A1 | 3/2004 | Liu |

* cited by examiner

*Primary Examiner*—Houshang Safaipour
(74) *Attorney, Agent, or Firm*—Taylor & Aust, PC

(57) ABSTRACT

A method to compensate for imperfect scanner motion in a scanning apparatus having a moveable scanner includes generating an error array by measuring errors in a scanner position at each of a plurality of spaced positions along a direction of travel of the scanner; generating an error compensation array from the error array based on a low frequency component of the error array; and using the error compensation array to adjust at least one parameter associated with the scanning apparatus during a document scanning operation.

41 Claims, 9 Drawing Sheets

METHOD AND APPARATUS TO COMPENSATE FOR IMPERFECT SCANNER MOTION

BACKGROUND OF THE INVENTION

1. Field of the Invention

The present invention relates to a scanning apparatus, and, more particularly, to a method and apparatus to compensate for imperfect scanner motion.

2. Description of the Related Art

A scanning apparatus is used to optically scan documents to generate corresponding image data. Such image data may be forwarded, for example, to an imaging apparatus, such as a printer, or may be transferred to another device, such as a computer or facsimile device.

One such scanning apparatus, commonly referred to as a flatbed scanner, typically controls and/or measures motion associated with the scanner at the scan motor, thereby allowing gear and belt imperfections of the scanner drive train to adversely impact scan quality. These mechanical imperfections cause low frequency errors, in the direction of scanner travel, that tend to be very repeatable for any particular scanner. Low frequency errors directly affect MTF scores (a common metric for scan resolution), and additionally on CCD (charge coupled device) scanners, also affect color registration. The end result is decreased scan quality and/or increased part cost. Traditionally gear accuracy has only been a concern for open-loop systems (step motor). However, since many closed-loop scanner systems (e.g., a DC motor driven system) utilize an encoder attached to the motor, transmission accuracy is equally important for both types of systems.

Thus, it is desirable to reduce the occurrence of scanning errors caused by variation in components of the scanning apparatus, such as due to manufacturing tolerances of one or more of components of the scanner drive train, e.g., gears, of the scanning apparatus.

What is needed in the art is method and apparatus to compensate for imperfect scanner motion.

SUMMARY OF THE INVENTION

The present invention provides a method and apparatus to compensate for imperfect scanner motion.

The present invention, in one form thereof, is directed to a method to compensate for imperfect scanner motion in a scanning apparatus having a moveable scanner. The method includes generating an error array by measuring errors in a scanner position at each of a plurality of spaced positions along a direction of travel of the scanner; generating an error compensation array from the error array based on a low frequency component of the error array; and using the error compensation array to adjust at least one parameter associated with the scanning apparatus during a document scanning operation.

The present invention, in another form thereof, is directed to a scanning apparatus. The scanning apparatus includes a scanning unit having a scanner. A drive unit is connected to the scanning unit. The drive unit includes a scan motor. A controller is communicatively coupled to the drive unit. The controller is configured to execute program steps to compensate for imperfect scanner motion of the scanner. The program steps include generating an error array by measuring errors in the scanner position at each of a plurality of spaced positions along a direction of travel of the scanner; generating an error compensation array from the error array based on a low frequency component of the error array; and using the error compensation array to adjust at least one parameter associated with the scanning apparatus during a document scanning operation.

The present invention, in still another form thereof, is directed to a scanning apparatus. The scanning apparatus includes a scanning unit having a scanner. A drive unit is connected to the scanning unit. The drive unit includes a toothed drive pulley, an idler pulley, and a toothed belt suspended between the toothed drive pulley and the idler pulley. The scanner is coupled to the toothed belt. A belt guard is installed in close proximity to the toothed drive pulley to prevent the toothed drive pulley from jumping teeth of the toothed belt.

The present invention, in still another form thereof, is directed to a method to compensate for imperfect scanner motion in a scanning apparatus having a moveable scanner, including generating an error array by measuring errors in a scanner position at each of a plurality of spaced positions along a direction of travel of the scanner; generating an error compensation array from the error array based on a low frequency component of the error array; and interpolating data contained in the error compensation array to provide continuous error correction of the scanner along a scanning range of the scanner, such as for example, continuous position error correction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
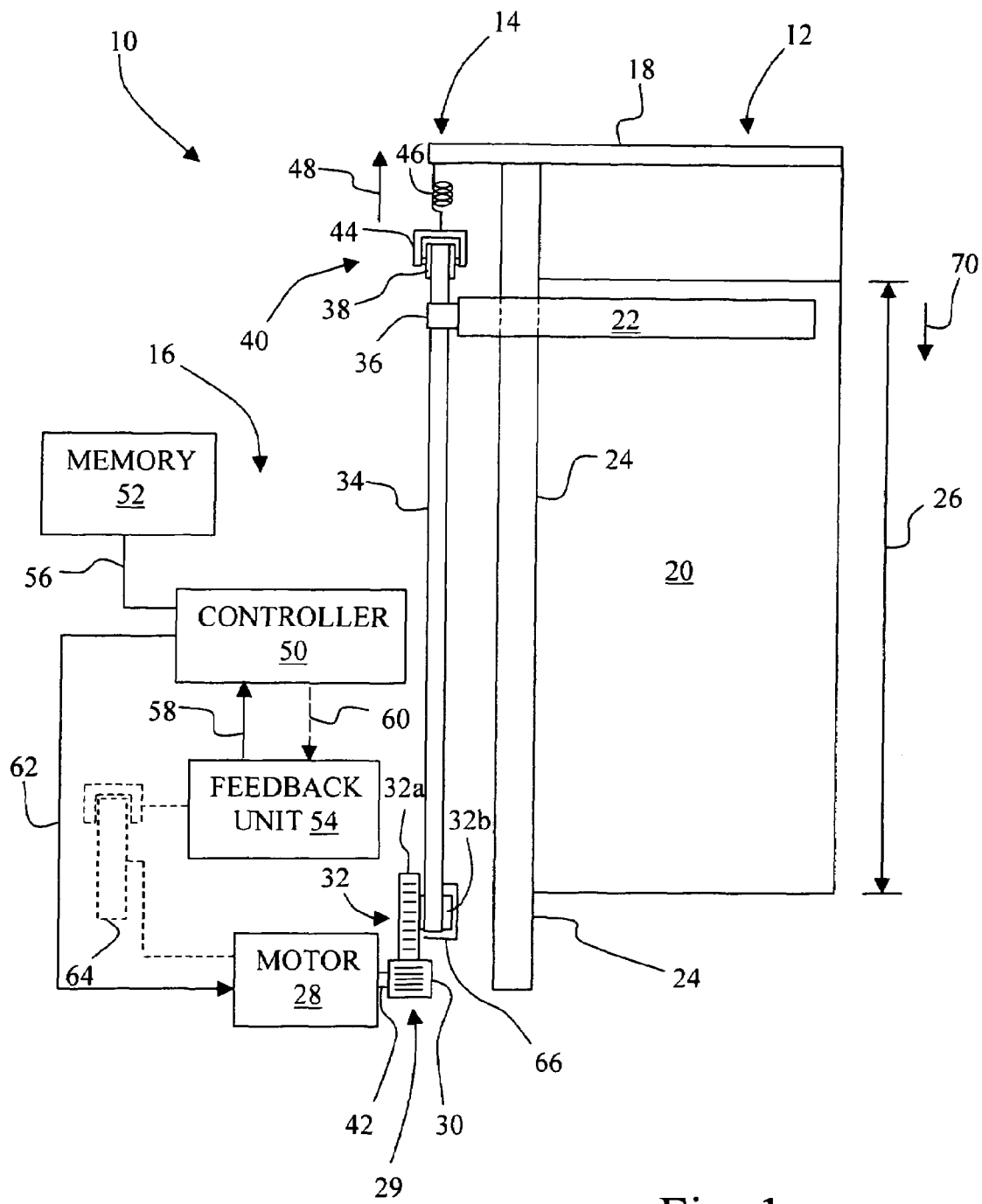
FIG. 1 is a diagrammatic illustration of a scanning apparatus embodying the present invention.

Referring now to the drawings and particularly to FIG. 1, there is shown a diagrammatic illustration of a scanning apparatus 10 in accordance with the present invention.

Scanning apparatus 10 includes a scanning unit 12, a drive unit 14 and a control unit 16.

Scanning unit 12 includes a housing 18, a transparent document platform 20 and a scanner 22. Scanner 22 is moveably coupled to housing 18 via a support rod 24. Scanner 22 is configured to move over a scanning range 26, as depicted by the double-headed arrow. Scanner 22 may be, for example, a CCD type scanner.

Drive unit 14 includes a scan motor 28 and a drive train 29 including a pinion gear 30, a driven gear/drive pulley arrangement 32, a toothed belt 34, a scanner attachment device 36, an idler pulley 38 and a belt tensioning device 40. Pinion gear 30 is attached to a rotatable shaft 42 of scan motor 28. Pinion gear 30 is position to mesh with a driven gear portion 32a of driven gear/drive pulley arrangement 32. A toothed drive pulley 32b of driven gear/drive pulley arrangement 32 includes teeth for engaging the teeth of toothed belt 34. Scanner attachment device 36 attaches scanner 22 to toothed belt 34.

Driven gear/drive pulley arrangement 32 may be formed having gear portion 32a and toothed drive pulley 32b formed as an integral unit. Those skilled in the art, however, will recognize that gear portion 32a and toothed drive pulley 32b of driven gear/drive pulley arrangement 32 may be separated, and coupled together, for example, via a drive shaft.

Idler pulley 38 and a belt-tensioning device 40 take up slack in tooth belt 34 to facilitate the transfer a linear motion to scanner 22 along scanning range 26. Accordingly, toothed belt 34 is suspended between toothed drive pulley 32b and idler pulley 38. Belt tensioning device 40 may include a yoke 44 mounted to idler pulley 38, and a spring 46 connected between housing 18 and yoke 44, so as to apply a force in direction 48 to maintain toothed belt 34 in a state of tension.

Control unit 16 includes a controller 50, a memory 52 and a feedback unit 54.

Controller 50 is communicatively coupled to memory 52 via a communication link 56. Controller 50 is communicatively coupled to feedback unit 54 via a communications link 58. Further, where scan motor 28 is a stepper motor, feedback unit 54 is communicatively coupled to scan motor 28 via a communication link 60 to receive step position data from controller 50. Communications link 60 is shown in dashed lines to indicate that it is not used in some embodiments of the present invention. Controller 50 is further communicatively coupled to scan motor 28 via a communication link 62. One or more of communication links 56, 58, 60, and 62 may be, for example, electrical or optical cabling, or may be a wireless connection.

Controller 50 may be, for example, formed as an application specific integrated circuit (ASIC), and includes processing capability, which may be in the form of a microprocessor having an associated random access memory (RAM), non-volatile RAM (NVRAM) and/or read only memory (ROM), which may be included in memory 52.

The nature of feedback unit 54 will depend on the type of motor that is selected for scan motor 28. For example, if scan motor 28 is a stepper motor, then controller 50 may store step position information in feedback unit 54, which may be formed integral with controller 50, and feedback unit 54 may feedback an ideal step position of scan motor 28 which in turn may be correlated to a linear position of scanner 22 along scanning range 26.

Alternatively, if scan motor 28 is a direct current (DC) motor, then feedback unit 54 may include a rotary encoder 64 (shown in dashed lines) connected to scan motor 28 to provide a rotary encoder position of rotary encoder 64, and in turn, the rotary position of pinion gear 30 and driven gear/drive pulley arrangement 32, and in turn, a linear position of scanner 22 along scanning range 26.

In order to maintain a fixed timing relationship between drive unit 14 and control unit 16, a belt guard 66 is installed in close proximity to toothed drive pulley 32b of driven gear/drive pulley arrangement 32 to prevent toothed drive pulley 32b from jumping the teeth of toothed belt 34, and vice versa. The configuration of belt guard 66 will be further discussed below following a discussion of a method associated with the present invention.

Ideally, scanner 22 is incrementally moved in equal increments along scanning range 26. However, in actual practice such may not be possible do to variations in component tolerances, which result in scan position errors. The present invention provides a method and apparatus to compensate for imperfect scanner motion, as illustrated in the flowchart depicted in FIG. 2, described in relation to the graphical representations shown in FIG. 3.

Figure 2:
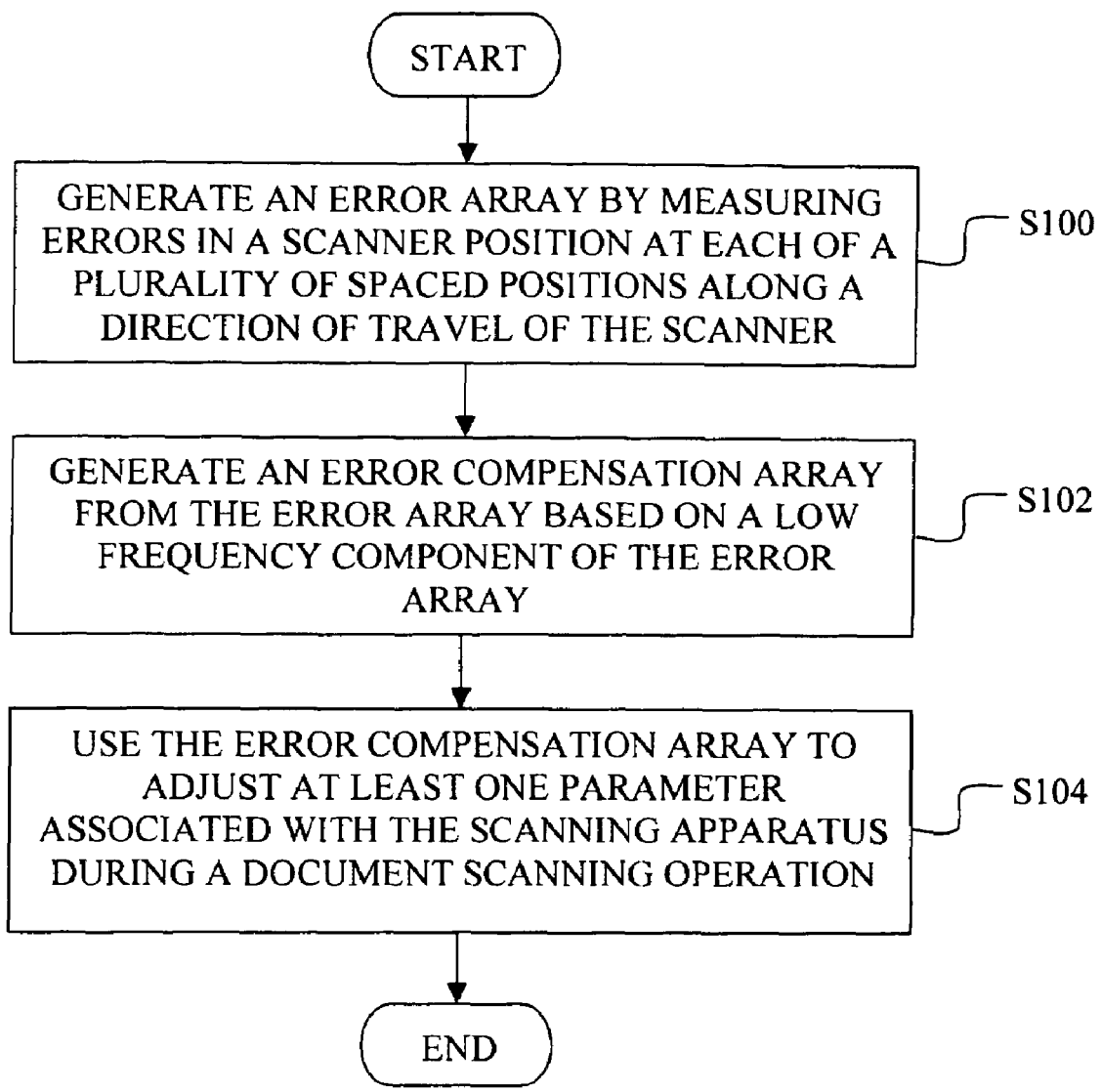
FIG. 2 is a flowchart of a method and apparatus to compensate for imperfect scanner motion, in accordance with an embodiment of the present invention.
Figure 3:
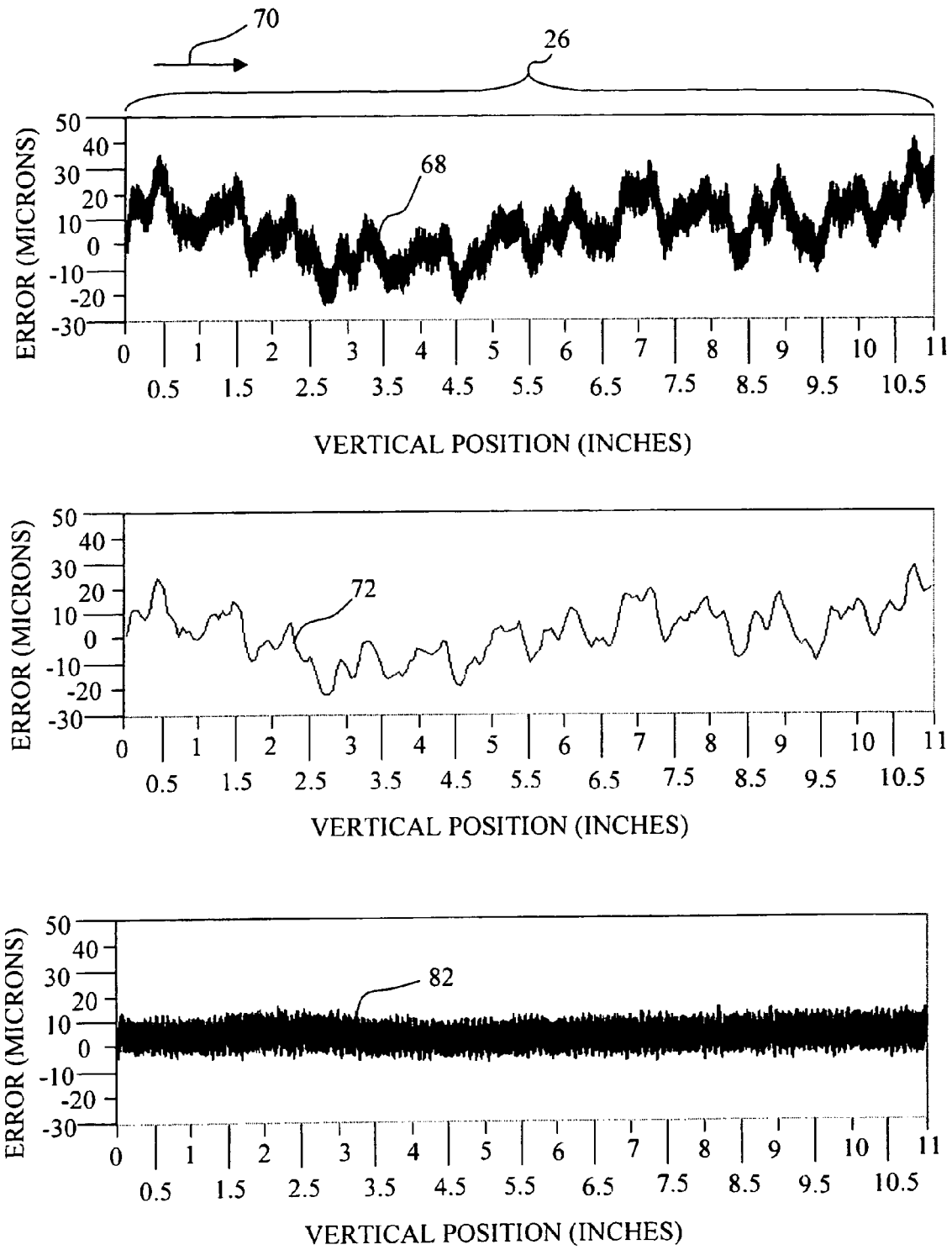
FIG. 3 is a graphical representation of the use of the method of FIG. 2.

Each of steps S100-S104 of FIG. 2 may be performed, for example, by program instructions executing on controller 50 in accordance with the exemplary method. Alternatively, steps S100 and S102 may be performed, for example, using a precision test fixture.

Referring to FIG. 2, at step S100, an error array 68 (graphically depicted in FIG. 3) associated with scanning apparatus 10 is generated by measuring errors in a scanner position of scanner 22 at each of a plurality of spaced positions along a direction of travel 70 of scanner 22. The plurality of spaced positions represent discrete points along direction of travel 70 of said scanner 22. The direction of travel 70 may be, for example, a vertical position with respect to the orientation of components as shown in FIG. 1. Error array 68 may be stored, for example, in memory 52, such as in the form of a look-up table (LUT).

The generation of error array 68 may be effected, for example, by scanning with scanner 22 a calibration sheet 74 (see FIG. 4) having a plurality of equally spaced horizontal lines 76 (individually identified as H1, H2, . . . . Hn) positioned at a predefined resolution in direction of travel 70 (vertical direction) of scanner 22 along the length of scanning range 26, and measuring the error values, which includes individual errors determined by comparing the sensed line position of a particular line, e.g., H1, H2, . . . . Hn (FIG. 4), ), with the known line position from calibration sheet 74, along scanning range 26. As shown in the graphical illustration of error array 68 of FIG. 3, such spacing is constant along the length of scanning range 26, and may be in constant increments in a range, for example, from one seventy-fifth (1/75) of an inch to one half (1/2) inch.

Figure 5:
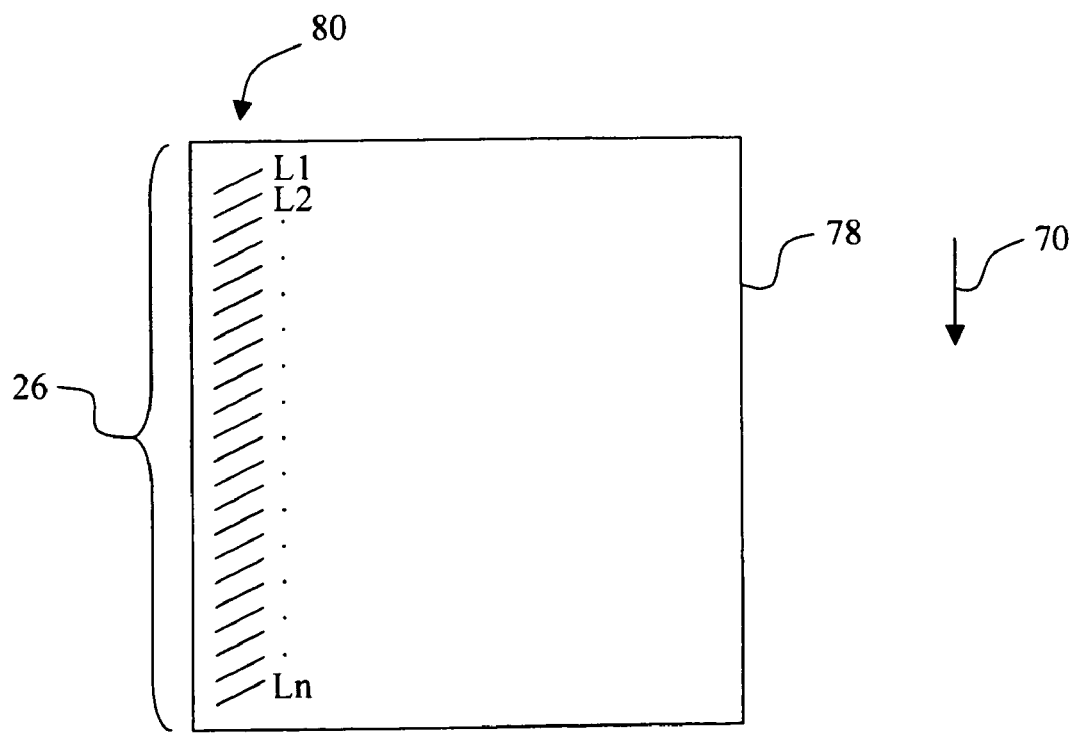
FIG. 5 is a front view of another calibration sheet configured for use with the method of FIG. 2.

Alternatively, the generation of error array 68 may be effected, for example, by scanning with scanner 22 a calibration sheet 78 (see FIG. 5) having a plurality of equally spaced diagonal lines 80 (L1, L2, . . . . Ln) positioned at a predefined resolution in direction of travel 70 (vertical direction) of scanner 22 along the length of scanning range 26, and measuring the error values at each line position determined by comparing the sensed line position of a particular line, e.g., at line L1, L2, . . . Ln (FIG. 5), with the known line position from calibration sheet 78.

At step S102, an error compensation array 72 (graphically depicted in FIG. 3) is generated from error array 68 based on a low frequency component of error array 68. The low frequency error component may be associated with errors in the scan position of scanner 22 occurring within about one revolution of a gear, such as for example, pinion gear 30 or gear portion 32a of driven gear/drive pulley arrangement 32 in drive unit 14. Error compensation array 72 will include a plurality of error compensation values E, which include individual error compensation values e1, e2, . . . en representing, for example, the error compensation values associated with each of the lines H1, H2, . . . Hn, or alternatively, at line L1, L2, . . . Ln, along scanning range 26.

At step S104, error compensation array 72 is used to adjust at least one parameter associated with scanning apparatus 10 during a document scanning operation. As illustrated by waveform 82, the use of error compensation array 72 may substantially reduce, or eliminate, the low frequency error component from error array 68. The parameter may be, for example, a rotational velocity of scan motor 28 that drives scanner 22. As another example, the parameter may be scan timing of scanner 22.

Figure 6:
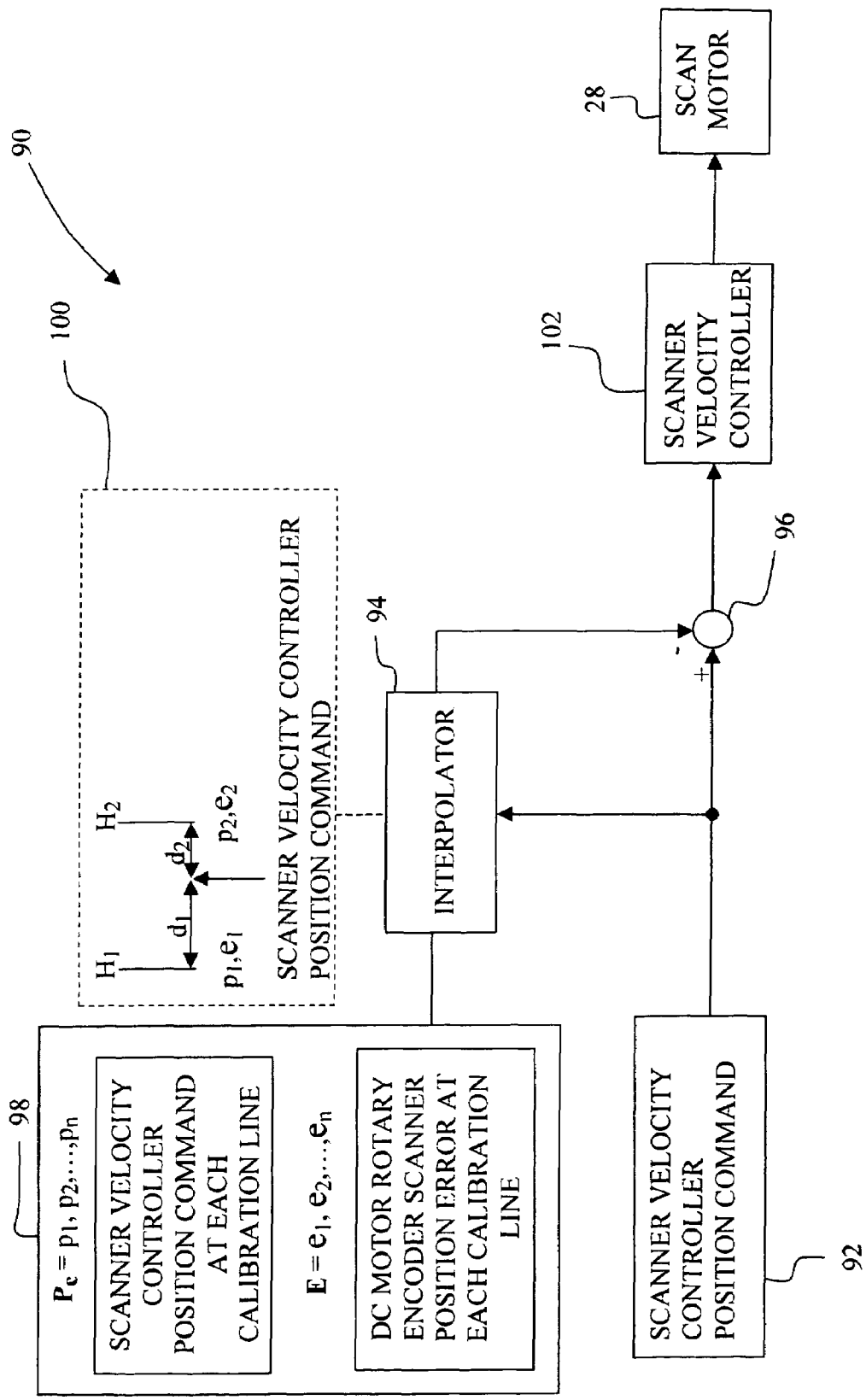
FIG. 6 is an exemplary scanner control system used in a DC motor fixed frequency scanning environment.
Figure 7:
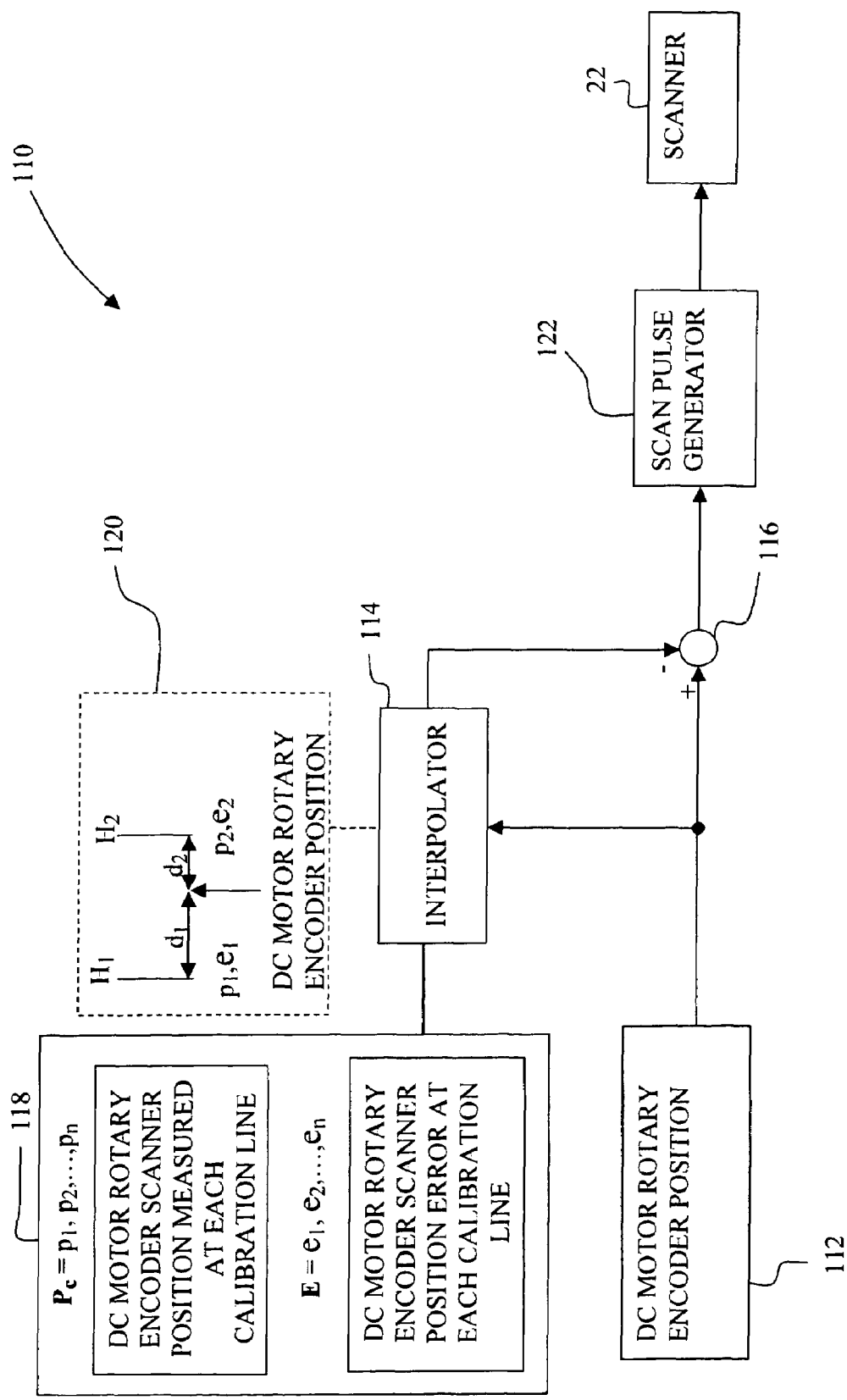
FIG. 7 is an exemplary scanner control system used in a position based DC motor rotary encoder scan pulse generation environment.
Figure 8:
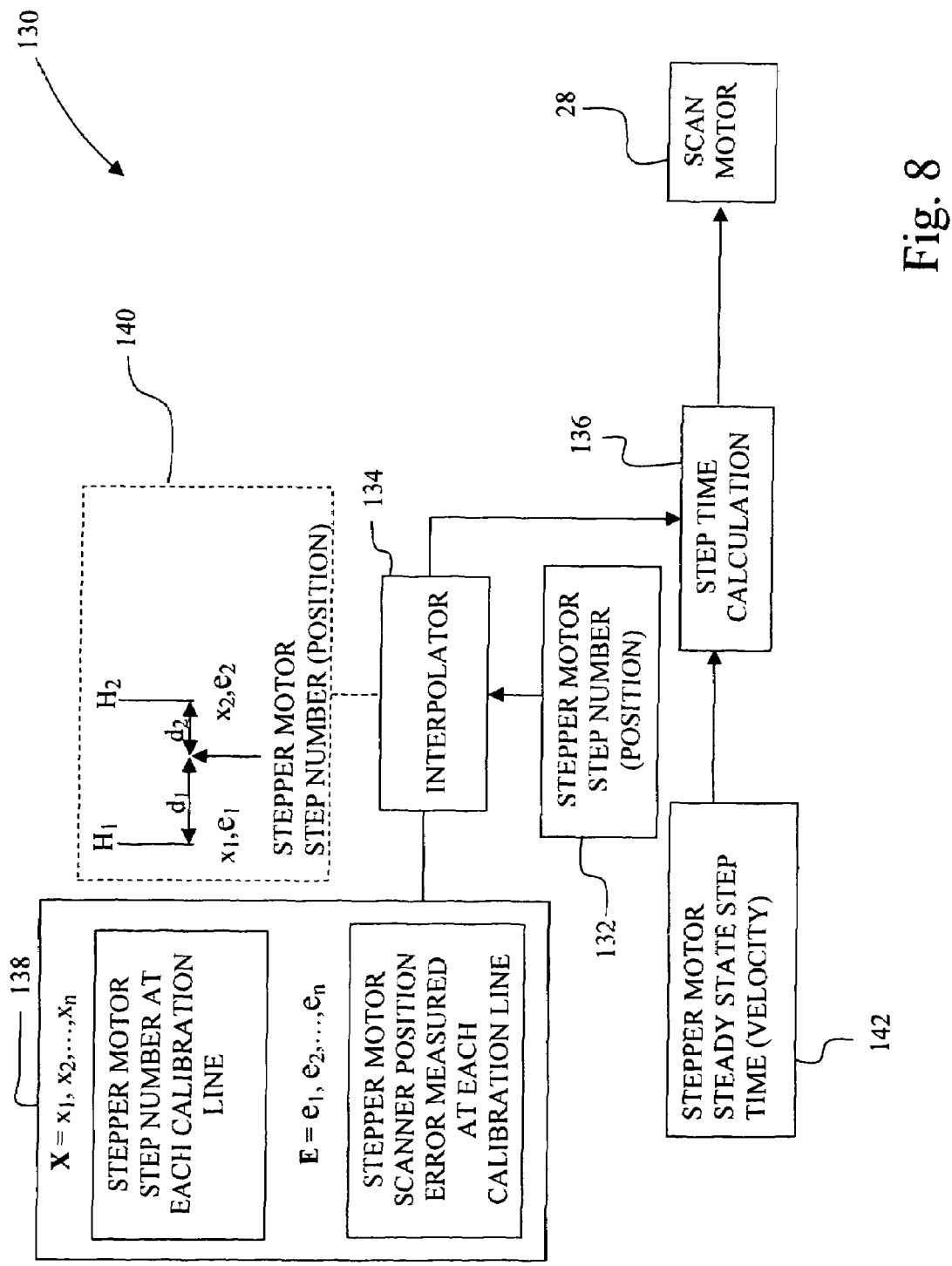
FIG. 8 is an exemplary scanner control system used in a stepper motor fixed frequency scanning environment.
Figure 9:
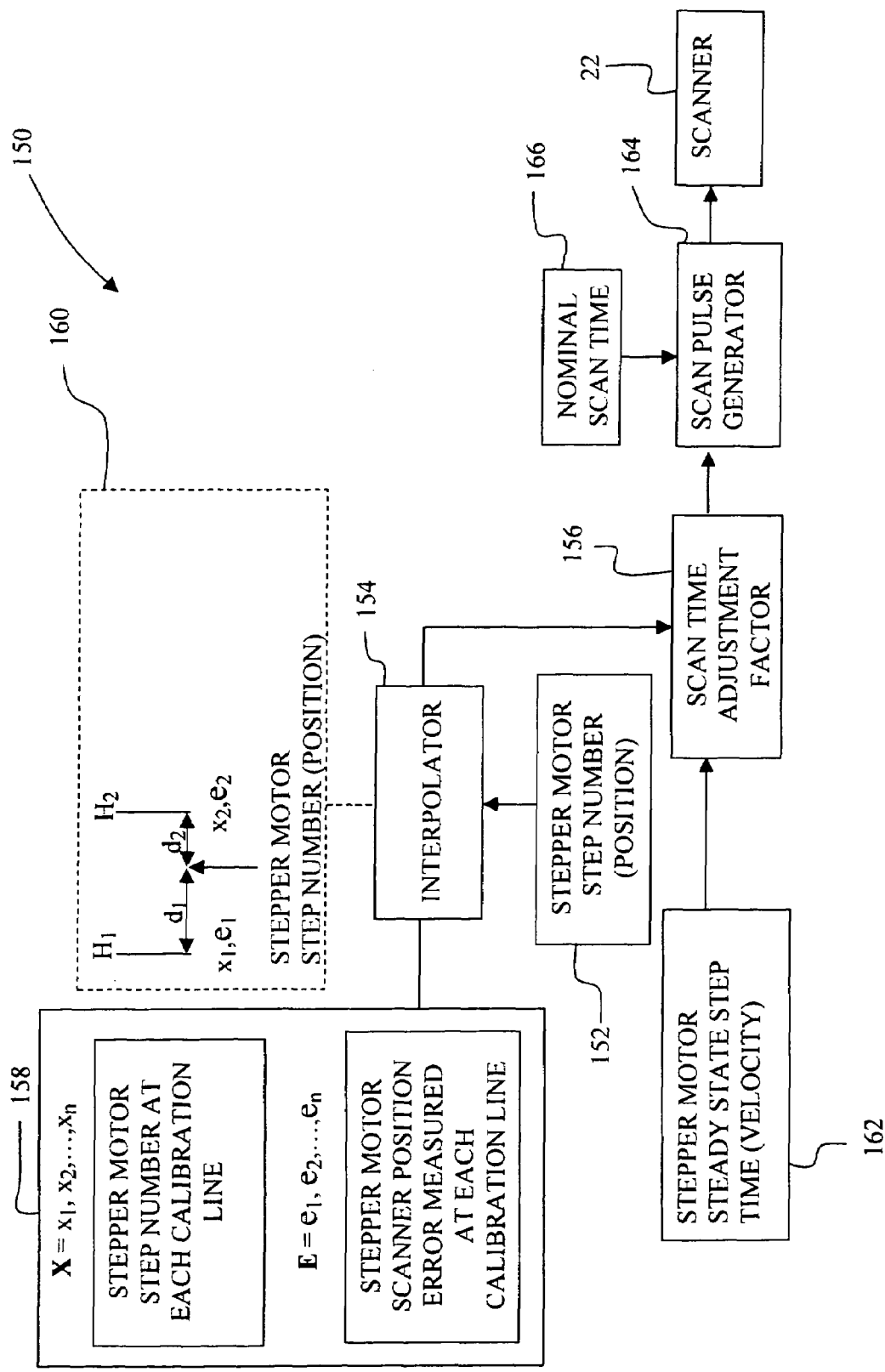
FIG. 9 is an exemplary scanner control system used in a stepper motor position based stepper scan pulse generation environment.

FIGS. 6-9 depict exemplary scanner control systems for controller 50 used to implement, generally, the method described above with respect to FIG. 2. FIGS. 6 and 7 are directed to scanner control systems, wherein scan motor 28 is a DC motor. FIGS. 8 and 9 are directed to scanner control systems, wherein scan motor 28 is a stepper motor.

EXAMPLE 1

Compensation for DC Motor Fixed Frequency Scanning

FIG. 6 diagrammatically depicts an exemplary scanner control system 90 for controller 50 used to implement the present invention with respect to scanner apparatus 10 having a DC motor as scan motor 28 in a fixed frequency scanning environment.

Figure 4:
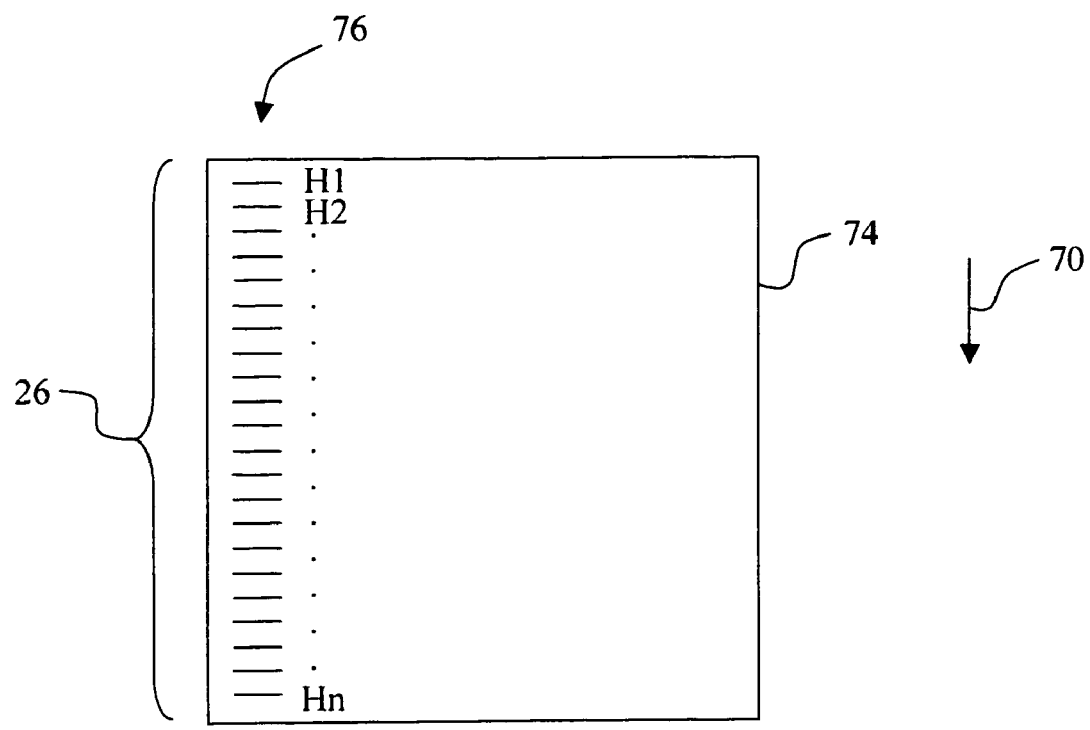
FIG. 4 is a front view of a calibration sheet configured for use with the method of FIG. 2.

In general, referring also to FIGS. 1 and 4, a change in the scanner position of scanner 22 is effected by a DC motor having associated therewith rotary encoder 64. Error compensation data from error compensation array 72 stored in memory 52, determined at each of the plurality of spaced positions along direction of travel 70 of scanner 22, is used to determine a scan position correction value used to adjust a scan position of scanner 22.

As shown in FIG. 6, input block 92 provides a scanner velocity controller position command, which in turn is fed to an interpolator 94 and to a summing node 96. Input block 98 correlates the scanner velocity controller position command (Pc=p1, p2, . . . , pn) at each calibration line, e.g., H1-Hn, with a DC motor rotary encoder scanner position error E=e1, e2, . . . , en from error compensation array 72, at each calibration line, e.g., H1-Hn, and in turn feeds this information to interpolator 94. Block 100, in dashed lines, illustrates the interpolation process for exemplary lines H1 and H2, wherein the current scanner velocity controller position command is used as an input to interpolator 94 to determine a distance d1 from line H1 and distance d2 from line H2, with respect to the scanner velocity controller position command p1 and the DC motor rotary encoder scanner position error e1 at calibration line H1, and with respect to the scanner velocity controller position command p2 and the DC motor rotary encoder scanner position error e2 at calibration line H2. Interpolator 94 outputs a scanner position error estimate for Example 1, $Pe_{Ex1}$, for each scanner velocity controller position determined by the formula:

$$Pe_{Ex1} = \frac{d_1}{d_1 + d_2} \cdot e_2 + \frac{d_2}{d_1 + d_2} \cdot e_1$$

The scanner position error estimate $Pe_{Ex1}$ is used as a correction factor for the scanner velocity controller position command of input block 92 to account for, or calibrate out, the scanner position error of scanner 22. The scanner position error estimate Pe is summed with the current scanner velocity controller position command at summing node 96. Summing node 96 then outputs a compensated scanner velocity controller position command which is supplied to scanner velocity controller block 102, which in turn supplies a scanner DC motor pulse width modulated (PWM) signal to scan motor (DC) 28. Accordingly, the rotational velocity of scan motor 28 is adjusted based on an interpolated value derived from error compensation array 72 to correct for errors in the scanner position. Scanner velocity controller block 102 may be, for example, a PID (proportional, plus integral, plus derivative) compensator for regulation of the scanner velocity of scanner 22.

Thus, interpolator 94 interpolates data contained in error compensation array 72 to provide continuous error correction of scanner 22 along a scanning range 26 of scanner 22. More particularly, the use of interpolator 94 facilitates the use of a continuum of compensated scanner velocity controller position commands even though the error compensation data in error compensation array 72 is collected in discrete, spaced positions, along scanning range 26 of scanner 22. Here, the term "continuum" refers to a continuous correction of the scanner velocity of scanner 22 at each scanner velocity controller position command of input block 92.

EXAMPLE 2

Compensation for Position Based DC Motor Rotary Encoder Scan Pulse Generation

FIG. 7 diagrammatically depicts an exemplary scanner control system 110 for controller 50 used to implement the present invention with respect to scanner apparatus 10 having a DC motor as scan motor 28 in a position based DC motor rotary encoder scan pulse generation environment.

In general, referring also to FIGS. 1 and 4, a change in the scanner position of scanner 22 is effected by a DC motor having associated therewith rotary encoder 64. Error compensation data from error compensation array 72 stored in memory 52, determined at each of the plurality of spaced positions along direction of travel 70 of scanner 22, is used to determine an encoder position correction value used to correct for scanner position error by adjusting a start time of scanner pulses, each scanner pulse being used to initiate an exposure by scanner 22.

As shown in FIG. 7, input block 112 provides a DC motor rotary encoder position, which in turn is fed to an interpolator 114 and to a summing node 116. Input block 118 correlates the DC motor rotary encoder scanner position (P=p1, p2, . . . , pn) measured at each calibration line, e.g., H1-Hn, with a DC motor rotary encoder scanner position error E=e1, e2, . . . , en from error compensation array 72, at each calibration line, e.g., H1-Hn, and in turn feeds this information to interpolator 114. Block 120, in dashed lines, illustrates the interpolation process for exemplary lines H 1 and H2, wherein the current DC motor rotary encoder position is used as an input to interpolator 114 to determine a distance d1 from line H1 and distance d2 from line H2, with respect to the DC motor rotary encoder scanner position p1 and the DC motor rotary encoder scanner position error e1 at calibration line H1, and with respect to the DC motor rotary encoder scanner position p2 and the DC motor rotary encoder scanner position error e2 at calibration line H2. Interpolator 114 outputs a position error estimate for Example 2, $Pe_{Ex2}$, for each rotary encoder position determined by the formula:

$$Pe_{Ex2} = \frac{d_1}{d_1 + d_2} \cdot e_2 + \frac{d_2}{d_1 + d_2} \cdot e_1$$

The position error estimate $Pe_{Ex2}$ is summed with the current DC motor rotary encoder position at summing node 116. Summing node 116 then outputs a compensated DC motor rotary encoder position which is supplied to scan pulse generator block 122, which in turn supplies scan pulses to scanner 22.

Thus, interpolator 114 interpolates data contained in error compensation array 72 to provide continuous error correction of scanner 22 along a scanning range 26 of scanner 22. More particularly, the use of interpolator 114 facilitates the use of a continuum of compensated DC motor rotary encoder positions even though the error compensation data in error compensation array 72 is collected in discrete, spaced positions, along scanning range 26 of scanner 22. Here, the term "continuum" refers to a continuous correction at each DC motor rotary encoder position of input block 112.

EXAMPLE 3

Compensation for Stepper Motor Fixed Frequency Scanning

FIG. 8 diagrammatically depicts an exemplary scanner control system 130 for controller 50 used to implement the present invention with respect to scanner apparatus 10 having a stepper motor as scan motor 28 in a fixed frequency scanning environment.

In general, referring also to FIGS. 1 and 4, a change in the scanner position is effected by a stepper motor, wherein error compensation data from error compensation array 72 stored in memory 52, determined at each of the plurality of spaced positions along direction of travel 70 of scanner 22, is used to determine a scan position correction value used to adjust a step time of the current step. The scan position correction value may be used in effecting a continuum of correction in a velocity of the stepper motor.

As shown in FIG. 8, input block 132 provides a stepper motor step number (e.g., position), which in turn is fed to an interpolator 134. Input block 138 correlates the stepper motor step number (X=x1, x2, . . . , xn) at each calibration line, e.g., H1-Hn, with a stepper motor scanner position error E=e1, e2, . . . , en from error compensation array 72, at each calibration line, e.g., H1-Hn, and in turn feeds this information to interpolator 134. Block 140, in dashed lines, illustrates the interpolation process for exemplary lines H1 and H2, wherein the current stepper motor step number (e.g., position) is used as an input to interpolator 134 to determine a distance d1 from line H1 and distance d2 from line H2, with respect to the stepper motor step number x1 and the stepper motor scanner position error e1 at calibration line H1, and with respect to the stepper motor step number x2 and the stepper motor scanner position error e2 at calibration line H2. Interpolator 94 outputs a position error estimate for Example 3, $Pe_{Ex3}$, for each stepper motor steady state time per step, which is determined by the formula:

$$Pe_{Ex3} = \frac{d_1}{d_1 + d_2} \cdot e_2 + \frac{d_2}{d_1 + d_2} \cdot e_1$$

A step time calculation block 136 receives position error estimate, $Pe_{Ex3}$, from interpolator 134, which is combined with input block 142, representing the current stepper motor steady state step time (e.g., velocity), to generate a compensated stepper motor steady state step time (e.g., velocity). The compensated stepper motor steady state step time (e.g., velocity) is supplied to scan motor (stepper) 28. Thus, the position error estimate Pe is used as an input to the step time calculation of block 136 to account for, or calibrate out, the scanner position error of scanner 22 by effectively adjusting the velocity of scanner 22.

Thus, interpolator 134 interpolates data contained in error compensation array 72 to provide continuous error correction of scanner 22 along a scanning range 26 of scanner 22. More particularly, the use of interpolator 134 facilitates the use of a continuum of compensated stepper motor steady state step times (e.g., velocities) even though the error compensation data in error compensation array 72 is collected in discrete, spaced positions, along scanning range 26 of scanner 22. Here, the term "continuum" refers to a continuous correction at each stepper motor step number (position) of input block 132.

EXAMPLE 4

Compensation for Position Based Stepper Scan Pulse Generation

FIG. 9 diagrammatically depicts an exemplary scanner control system 150 for controller 50 used to implement the present invention with respect to scanner apparatus 10 having a stepper motor as scan motor 28 in a position based stepper scan pulse generation environment.

In general, referring also to FIGS. 1 and 4, a change in the scanner position is effected by a stepper motor, wherein error compensation data from error compensation array 72 stored in memory 52, determined at each of the plurality of spaced positions along direction of travel 70 of scanner 22, is used to determine a scan time adjustment value used to adjust a scan timing of scanner 22.

As shown in FIG. 9, input block 152 provides a stepper motor step number (e.g., position), which in turn is fed to an interpolator 154. Input block 158 correlates the stepper motor step number (X=x1, x2, . . . , xn) at each calibration line, e.g., H1-Hn, with a stepper motor scanner position error E=e1, e2, . . . , en from error compensation array 72, at each calibration line, e.g., H1-Hn, and in turn feeds this information to interpolator 154. Block 160, in dashed lines, illustrates the interpolation process for exemplary lines H1 and H2, wherein the current stepper motor step number (e.g., position) is used as an input to interpolator 154 to determine a distance d1 from line H1 and distance d2 from line H2, with respect to the stepper motor step number x1 and the stepper motor scanner position error e1 at calibration line H1, and with respect to the stepper motor step number x2 and the stepper motor scanner position error e2 at calibration line H2. Interpolator 154 outputs a position error estimate for Example 4, $Pe_{Ex4}$, for each stepper motor step, which is determined by the formula:

$$Pe_{Ex4} = \frac{d_1}{d_1+d_2} \cdot e_2 + \frac{d_2}{d_1+d_2} \cdot e_1$$

A scan time adjustment factor block 156 receives position error estimate, $Pe_{Ex4}$, from interpolator 154, which is combined with input block 162, representing the current stepper motor steady state step time (e.g., velocity), to generate a scan time adjustment factor. The scan time adjustment factor generated in scan time adjustment factor block 156 is then supplied to a scan pulse generator block 164, which also receives a nominal scan time input from input block 166, from which a scan pulse is derived and output to scanner 22. Thus, the scan time adjustment factor is used to modify the nominal scan time of scanner 22, thereby adjusting for scanner position errors.

Thus, interpolator 154 interpolates data contained in error compensation array 72 to provide continuous error correction of the scanner along a scanning range 26 of scanner 22. More particularly, the use of interpolator 154 facilitates the use of a continuum of scan time adjustment factors even though the error compensation data in error compensation array 72 is collected in discrete, spaced positions, along scanning range 26 of scanner 22. Here, the term "continuum" refers to a continuous correction at each stepper motor step number (position) of input block 152.

Figure 10:
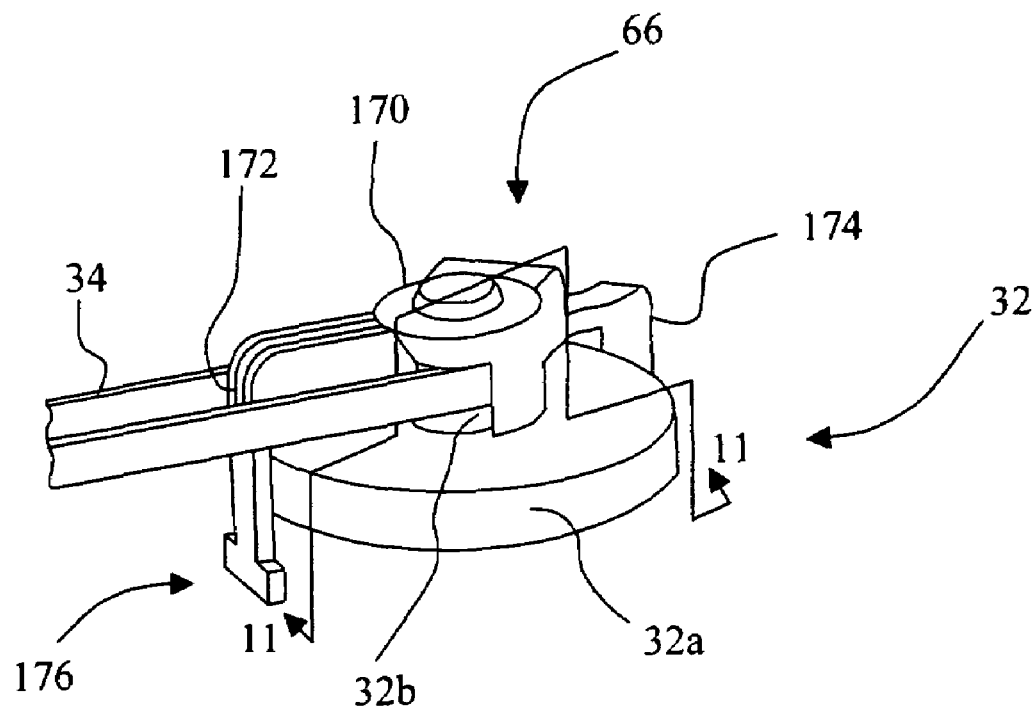
FIG. 10 is perspective view of an embodiment of a belt guard of the scanning apparatus of FIG. 1.

In order to assure integrity of the method and algorithms associated with the present feature, described above, belt guard 66 (see FIGS. 1, 10 and 11) is installed in close proximity to toothed drive pulley 32b of driven gear/drive pulley arrangement 32 to prevent toothed drive pulley 32b from jumping the teeth of toothed belt 34, and vice versa. For example, if, after making error measurements of scanning apparatus 10, as described above, for example, toothed belt 34 jumps teeth of toothed drive pulley 32b, then the relationship between the error data stored in memory 52 with respect to scanner position will no longer be accurate. An exemplary embodiment of belt guard 66 will be described, referring to FIGS. 10 and 11.

Figure 11:
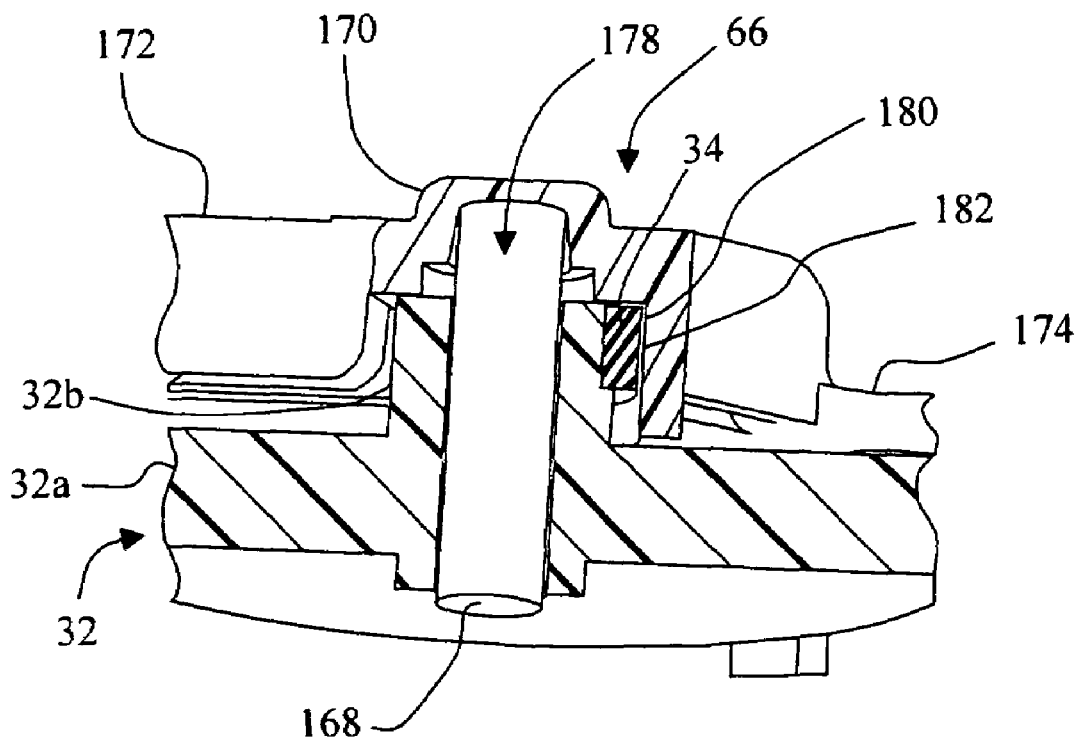
FIG. 11 is a sectional view of the belt guard taken along line 11-1 of FIG. 10.

A shown in the sectional view of FIG. 11, driven gear/drive pulley arrangement 32 is positioned to rotate about an axle 168, within the confines of belt guard 66. Belt guard 66 includes a guard body 170 having formed integral therewith a pair of suspension members 172, 174. A distal end 176 of suspension members 172, 174 is configured for attachment to a frame, such as for example, housing 18. Guard body 170 includes a cavity 178 for receiving toothed drive pulley 32b of driven gear/drive pulley arrangement 32 with toothed belt 34 installed thereon. Guard body 170 is configured to define a small controlled clearance 180 between an inner wall 182 of guard body 170 and toothed belt 34, and toothed drive pulley 32b, so that under normal operating conditions there is no contact between toothed belt 34, or toothed drive pulley 32b, with belt guard 66. However, controlled clearance 180 is maintained small enough so that under extreme conditions, e.g., a physical manipulation of scanner 22, or the dropping of scanning apparatus 10, the teeth of toothed drive pulley 32b of driven gear/drive pulley arrangement 32 remain engaged with the teeth of toothed belt 34, so as to prevent toothed drive pulley 32b from jumping teeth with respect to toothed belt 34.

While the present invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method to compensate for imperfect scanner motion in a scanning apparatus having a moveable scanner, comprising:
   generating an error array by measuring errors in a scanner position at each of a plurality of spaced positions along a direction of travel of said scanner;
   generating an error compensation array from said error array based on a low frequency component of said error array;
   interpolating data contained in said error compensation array to provide continuous error correction of said scanner along a scanning range of said scanner,
   wherein a scan motor is coupled to said scanner via a drive train, said low frequency error component being associated with errors in said scan position occurring within about one revolution of gear in said drive train, and
   wherein said drive train includes a toothed drive belt which engages a toothed pulley associated with said scanner, said scanning apparatus including a belt guard to prevent said toothed pulley from jumping teeth with respect to said toothed drive belt.

2. A method to compensate for imperfect scanner motion in a scanning apparatus having a moveable scanner, comprising:
   generating an error array by measuring errors in a scanner position at each of a plurality of spaced positions along a direction of travel of said scanner;
   generating an error compensation array from said error array based on a low frequency component of said error array;
   wherein the act of generating said error array is effected by scanning a calibration sheet having a plurality of equally spaced lines positioned at a predefined resolution in said direction of travel of said scanner; and
   using said error compensation array to adjust at least one parameter associated with said scanning apparatus during a document scanning operation.

3. The method of claim 2, wherein said plurality of spaced positions represents discrete points along said direction of travel of said scanner.

4. The method of claim 2, comprising the step of interpolating data contained in said error compensation array to provide continuous error correction of said scanner along a scanning range of said scanner.

5. The method of claim 2, further comprising generating position data associated with said scanner at each of said plurality of spaced positions along said direction of travel of said scanner.

6. The method of claim 2, wherein said plurality of equally spaced lines is formed at a diagonal with respect to said direction of travel of said scanner.

7. The method of claim 2, wherein said at least one parameter is a rotational velocity of a scan motor that drives said scanner.

8. The method of claim 7, wherein said rotational velocity of said scan motor is adjusted based on an interpolated value derived from said error compensation array to correct for said errors in said scanner position.

9. The method of claim 2, wherein a scan motor is coupled to said scanner via a drive train, said low frequency error component being associated with errors in said scan position occurring within about one revolution of a gear in said drive train.

10. The method of claim 9, wherein said drive train includes a toothed drive belt which engages a toothed pulley associated with said scanner, said scanning apparatus including a belt guard to prevent said toothed pulley from jumping teeth with respect to said toothed drive belt.

11. The method of claim 10, wherein said toothed pulley is formed integral with said gear.

12. The method of claim 2, wherein said at least one parameter is a scan timing of said scanner.

13. The method of claim 2, wherein said error compensation array is stored in a memory of said scanning apparatus.

14. The method of claim 2, wherein a change in said scanner position is effected by a DC motor, said DC motor having associated therewith a rotary encoder,
wherein error compensation data from said error compensation array is used to determine a scan position correction value used to adjust a scan position of said scanner.

15. The method of claim 14, wherein said scan position correction value is used in effecting a continuous correction in a scanner velocity of said scanner.

16. The method of claim 2, wherein a change in said scanner position is effected by a DC motor, said DC motor having associated therewith a rotary encoder,
wherein error compensation data from said error compensation array is used to determine an encoder position correction value used to correct for a scanner position error by adjusting a start time of scanner pulses used to initiate each exposure by said scanner.

17. The method of claim 2, wherein a change in said scanner position is effected by a stepper motor, wherein error compensation data from said error compensation array is used to determine a scan position correction value used to adjust a step time of a current step.

18. The method of claim 17, wherein said scan position correction value is used in effecting a continuous correction of said step time at each stepper motor step number.

19. The method of claim 2, wherein a change in said scanner position is effected by a stepper motor, wherein error compensation data from said error compensation array is used to determine a scan time adjustment value used to adjust a scan timing of said scanner.

20. The method of claim 19, wherein said scan time adjustment value is used to modify a nominal scan time of said scanner, thereby adjusting for scanner position errors.

21. The method of claim 2, wherein said plurality of equally spaced lines is formed at a horizontal with respect to said direction of travel of said scanner.

22. A scanning apparatus, comprising:
a scanning unit including a scanner;
a drive unit connected to said scanning unit, said drive unit including a scan motor; and
a controller communicatively coupled to said drive unit, said controller being configured to execute program steps to compensate for imperfect scanner motion of said scanner, said program steps including:
generating an error array by measuring errors in a scanner position at each of a plurality of spaced positions along a direction of travel of said scanner, said error array being generated by scanning a calibration sheet having a plurality of equally spaced lines positioned at a predefined resolution in said direction of travel of said scanner;
generating an error compensation array from said error array based on a low frequency component of said error array; and
using said error compensation array to adjust at least one parameter associated with said scanning apparatus during a document scanning operation.

23. The scanning apparatus of claim 22, wherein said plurality of spaced positions represent discrete points along said direction of travel of said scanner.

24. The scanning apparatus of claim 22, comprising the step of interpolating data contained in said error compensation array to provide continuous error correction of said scanner along a scanning range of said scanner.

25. The scanning apparatus of claim 22, further comprising generating position data associated with said scanner at each of said plurality of spaced positions along said direction of travel of said scanner.

26. The scanning apparatus of claim 22, wherein said plurality of equally spaced lines is formed at a diagonal with respect to said direction of travel of said scanner.

27. The scanning apparatus of claim 22, wherein said at least one parameter is a rotational velocity of said scan motor that drives said scanner.

28. The scanning apparatus of claim 27, wherein said rotational velocity of said scan motor is adjusted based on an interpolated value derived from said error compensation array to correct for said errors in said scanner position.

29. The scanning apparatus of claim 22, wherein said scan motor is coupled to said scanner via a drive train of said drive unit, said low frequency error component being associated with errors in said scan position occurring within about one revolution of a gear in said drive train.

30. The scanning apparatus of claim 29, wherein said drive train includes a toothed drive belt which engages a toothed pulley associated with said scanner, said scanning apparatus including a belt guard to prevent said toothed pulley from jumping teeth with respect to said toothed drive belt.

31. The scanning apparatus of claim 30, wherein said toothed pulley is formed integral with said gear.

32. The scanning apparatus of claim 22, wherein said at least one parameter is a scan timing of said scanner.

33. The scanning apparatus of claim 22, comprising a memory for storing said error compensation array.

34. The scanning apparatus of claim 22, wherein a change in said scanner position is effected by a DC motor, said DC motor having associated therewith a rotary encoder, wherein error compensation data from said error compensation array is used to determine a scan position correction value used to adjust a scan position of said scanner.

35. The scanning apparatus of claim 34, wherein said scan position correction value is used in effecting a continuous correction in a scanner velocity of said scanner.

36. The scanning apparatus of claim 22, wherein a change in said scanner position is effected by a DC motor, said DC motor having associated therewith a rotary encoder, wherein error compensation data from said error compensation array is used to determine an encoder position correction value used to correct for a scanner position error by adjusting a start time of scanner pulses used to initiate each exposure by said scanner.

37. The scanning apparatus of claim 22, wherein a change in said scanner position is effected by a stepper motor, wherein error compensation data from said error compensation array is used to determine a scan position correction value used to adjust a step time of a current step.

38. The scanning apparatus of claim 37, wherein said scan position correction value is used in effecting a continuous correction of said step time at each stepper motor step number.

39. The scanning apparatus of claim 22, wherein a change in said scanner position is effected by a stepper motor, wherein error compensation data from said error compensation array is used to determine a scan time adjustment value used to adjust a scan timing of said scanner.

40. The scanning apparatus of claim 39, wherein said scan time adjustment value is used to modify a nominal scan time of said scanner, thereby adjusting for scanner position errors.

41. The scanning apparatus of claim 22, wherein said plurality of equally spaced lines is formed at a horizontal with respect to said direction of travel of said scanner.

* * * * *

UNITED STATES PATENT AND TRADEMARK OFFICE
CERTIFICATE OF CORRECTION

PATENT NO.      : 7,605,953 B2                                Page 1 of 1
APPLICATION NO. : 10/863909
DATED           : October 20, 2009
INVENTOR(S)     : Crooker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1478 days.

Signed and Sealed this

Fifth Day of October, 2010

David J. Kappos
*Director of the United States Patent and Trademark Office*